United States Patent
Chan et al.

(10) Patent No.: US 10,193,745 B2
(45) Date of Patent: Jan. 29, 2019

(54) RADIO INTERRUPT

(71) Applicant: Aruba Networks, Inc., Sunnyvale, CA (US)

(72) Inventors: Ho-Kuo Chan, St. Laurent (CA); Shahnawaz Siraj, Sunnyvale, CA (US); Andre Beaudin, Montreal (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 99 days.

(21) Appl. No.: 15/334,810

(22) Filed: Oct. 26, 2016

(65) Prior Publication Data

US 2018/0115458 A1  Apr. 26, 2018

(51) Int. Cl.
*H04L 12/24* (2006.01)
*H04L 12/40* (2006.01)
*H04L 12/26* (2006.01)
*H04W 88/04* (2009.01)
*H04W 92/10* (2009.01)

(52) U.S. Cl.
CPC .......... *H04L 41/0672* (2013.01); *H04L 12/40* (2013.01); *H04L 43/16* (2013.01); *H04W 88/04* (2013.01); *H04W 92/10* (2013.01)

(58) Field of Classification Search
None
See application file for complete search history.

(56) References Cited

U.S. PATENT DOCUMENTS

| | | | | |
|---|---|---|---|---|
| 5,155,729 A | * | 10/1992 | Rysko | G06F 11/20 714/11 |
| 8,665,851 B2 | | 3/2014 | Smith et al. | |
| 2008/0253280 A1 | * | 10/2008 | Tang | H04B 1/74 370/216 |
| 2010/0041392 A1 | * | 2/2010 | Hirata | H04W 24/04 455/425 |
| 2016/0029220 A1 | * | 1/2016 | Obaidi | H04W 12/06 455/411 |

* cited by examiner

*Primary Examiner* — Vinncelas Louis
(74) *Attorney, Agent, or Firm* — Brooks, Cameron & Huebsch, PLLC

(57) ABSTRACT

Example implementations relate to a radio interrupt reboot. For example, an apparatus may include a first processing resource connected via an interface to a second processing resource. The first processing resource may execute instructions to receive an interrupt generated by a radio coupled to the second processing resource, increment a counter in response to receiving the interrupt during a configurable time interval, and determine that the counter has not been incremented during a threshold number of configurable time intervals. The first processing resource may execute instructions to reboot the first processing resource and the second processing resource in response to the determination that the counter has not been incremented during the threshold number of configurable time intervals.

14 Claims, 4 Drawing Sheets

RADIO INTERRUPT

BACKGROUND

A radio may be included in an access point (AP). An AP may be a networking hardware device that can allow a wireless-compliant device such as a station to connect to a network. A processor, a co-processor, and a radio may be included in the AP. The co-processor may control operation of the radio, which may facilitate communication between the AP and a station.

DETAILED DESCRIPTION

Figure 1:
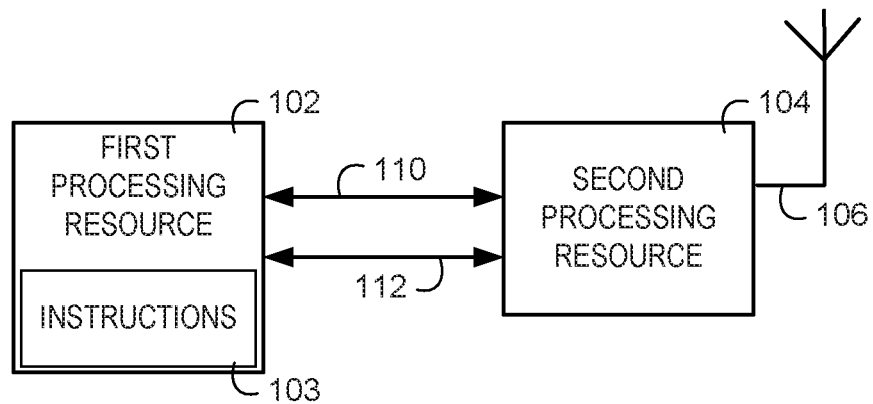
FIG. 1 illustrates a diagram of an example of a first processing resource and a second processing resource consistent with the disclosure.

Wireless networks may be deployed to provide various types of communication to multiple users through the air using electromagnetic waves generated by a radio or radios. As a result, various types of communication may be provided to multiple users without cables, wires, or other physical electric conductors to couple devices in the wireless network. Examples of the various types of communication that may be provided by wireless networks include voice communication, data communication, multimedia services, etc.

An example of a wireless network is a wireless local area network (WLAN). As used herein, wireless local area network (WLAN) generally refers to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network. WLANs may include multiple stations (STAs) and/or access points (APs) that may communicate over a plurality of wireless channels. An AP may be a networking hardware device that can allow a wireless-compliant device (e.g., a STA) to connect to a network. The STAs and/or APs may include a radio or radios to communicate and/or exchange information over the plurality of wireless channels. As used herein, information is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format such as a plurality of packets, frames, or cells. As used herein, a "radio" is an antenna or aerial which converts electric power into electromagnetic waves and vice versa.

An AP may provide connectivity with a network such as the internet to the STAs. As used herein, AP generally refers to receiving points for any known or convenient wireless technology which may later become known. Specifically, the term AP is not intended to be limited to Institute of Electrical and Electronics Engineers (IEEE) 802.11-based APs. APs generally function as an electronic device that is adapted to allow wireless devices to connect to a wired network via various communications standards. As used herein, a STA is a device that has the capability to use the IEEE 802.11 protocol. Examples of STAs include smart phones, laptops, physical non-virtualized computing devices, personal digital assistants, etc. In some examples, a STA may be a device that contains an IEEE 802.11-conformant media access control (MAC) and physical layer (PHY) interface to a wireless medium (WM).

Wireless networks such as WLANs can use various wireless communication technologies. As an example, WLANs may use orthogonal frequency division multiplexing (OFDM). In an OFDM based wireless network, a data stream is split into multiple data substreams. Such data substreams may be sent over different OFDM subcarriers, which can be referred to as tones or frequency tones. Some wireless networks may use a single-in-single-out (SISO) communication approach, where each STA and/or AP uses a single antenna. Other wireless networks may use a multiple-in-multiple-out (MIMO) communication approach, where a STA and/or AP uses multiple transmit radios and multiple receive radios. WLANs such as those defined in the IEEE wireless communications standards, e.g., IEEE 802.11a, IEEE 802.11n, IEEE 802.11ac, etc. can use OFDM to transmit and receive signals. Moreover, WLANs, such as those based on the IEEE 802.11n or IEEE 802.11ac standards, can use OFDM and MIMO.

In some approaches, an AP may include a processing resource (e.g., a processor), and a co-processing resource (e.g., a co-processor) or co-processing resources (e.g., co-processors). The processing resource and/or co-processing resource(s) may include hardware processors, microprocessors, etc. The co-processing resource(s) may be used to offload tasks from the processing resource. For example, time sensitive and/or repetitive tasks may be offloaded from the processor to the co-processor(s). The terms "processing resource" and "processor," as well as "co-processing resource" and "co-processor" are used interchangeably herein.

In some approaches, the processor and co-processor(s) may operate in distinct operating environments, and may interact via an interface (e.g., a hardware interface) and/or a bus. For example, a processing resource may operate according to a first operating environment, and the co-processor(s) may operate according to a second operating environment. As used herein, an "operating environment" is a set of instructions associated with a particular application. For example, an operating environment may include an operating system, database system, development tools, and/or a compiler associated with a particular application or applications.

The interface may be, for example, a hardware component connected to the processor and the co-processor(s) and may allow for signals to be exchanged between the processor and the co-processor(s). The bus may be, for example, a peripheral component interconnect (PCI) bus, or a PCI express bus. In some examples, the bus may allow for signals and/or information (e.g., data) to be exchanged between the processor and the co-processor(s). As used herein, 'interconnect' or used descriptively as 'interconnected' is generally defined as a communication pathway established over an information-carrying medium. The 'interconnect' may be a wired interconnect, wherein the medium is a physical medium (e.g., electrical wire, optical fiber, cable, bus traces, etc.), a wireless interconnect (e.g., air in combination with wireless signaling technology) or a combination of these technologies.

In some approaches, the co-processor(s) may fail. For example, the operating environment that the co-processor(s) operate according to may crash, freeze, hang, or otherwise fail. In some approaches, the co-processor(s) may be provided with a recovery mechanism to recover from such failures. For example, the co-processor(s) may detect an invalid memory access, and/or may include a timer (e.g., a watchdog timer) that may allow for recovery of the co-processor(s) in the event of a failure. However, implementing these recovery mechanisms may include providing signals from the co-processor(s) to the processor via an interface, and may therefore fail to recover the co-processor(s) in the event that the co-processor's interface to the processor itself fails.

In contrast, examples herein may allow for detection and/or recovery of a co-processor failure. For example, a processor may monitor a co-processor for activity. The activity may include interrupts that are received by the processor via a bus. In some examples, a radio connected to the co-processor(s) may generate interrupts that may be received by the processor via the bus. The radio may generate interrupts even when the radio is powered down (e.g., turned off). In some examples, the radio may generate interrupts at a rate greater than one per second. As used herein, an interrupt is a signal emitted by hardware and/or instructions indicating that an event may receive attention. An interrupt may be received by a processor.

In some examples, a counter may be incremented in response to receiving an interrupt from the radio. For example, a counter associated with the radio's interrupt service routine or "bottom half handler" may be incremented in response to receiving the interrupt from the radio. The counter may be available to a detection mechanism that may execute operations periodically. For example, the detection mechanism may execute operations at a periodic interval of around one second; however, the periodic interval may be greater than one second or less than one second. In some examples, the periodic interval may be configurable. As used herein, the term 'mechanism' generally refers to a component of a system or device to serve one or more functions, including but not limited to, software components, electronic components, electrical components, mechanical components, electro-mechanical components, etc.

In some examples, the detection mechanism may check if a value associated with the counter has changed since a previous interval. If the value associated with the counter has not changed for a configurable number of intervals, the detection mechanism may reboot the AP. In some examples, the detection mechanism may store a reason for the reboot. The detection mechanism may be executed by a processing resource associated with the AP. In some examples, the configurable number of intervals may be selected such that other recovery mechanisms associated with the AP's processing resource and/or co-processing resource(s) are not short-circuited. As used herein, reboot means the process of restarting a computing device, processor, AP, STA, or the like.

Examples of the present disclosure include apparatuses and computer-readable media storing executable instructions for a radio interrupt reboot. For example, apparatuses and machine-readable media storing executable instructions may allow for reboot of an apparatus based on radio interrupt signals. In some examples, an apparatus may comprise a first processing resource connected via an interface to a second processing resource. The first processing resource may receive an interrupt generated by a radio coupled to the second processing resource, increment a counter in response to receiving the interrupt during a configurable time interval, and determine that the counter has not been incremented during a threshold number of configurable time intervals. The first processing resource may reboot the first processing resource and the second processing resource in response to the determination that the counter has not been incremented during the threshold number of configurable time intervals.

Turning now to the figures, FIG. 1 illustrates a diagram of an example of a first processing resource 102 and a second processing resource 104 consistent with the disclosure. The first processing resource 102 may be a processor (e.g., a main processor), and the second processing resource 104 may be a co-processor. As illustrated in FIG. 1, the first processing resource 102 and the second processing resource 104 may be connected via an interface 110 and a bus 112. In some examples, the interface 110 may allow for signals to be exchanged between the first processing resource and the second processing resource, and the bus 112 may allow for activity of the second processing resource 104 to be monitored, for example, by the first processing resource 102. A radio 106 (as described in more detail herein in connection with FIGS. 2, 3A, and 3B) may be connected to the second processing resource 104.

In some examples, first processing resource 102 may execute instructions 103. The instructions 103 may be stored on a non-transitory machine-readable medium. The non-transitory machine readable medium may be any type of volatile or non-volatile memory or storage, such as random access memory (RAM), flash memory, read-only memory (ROM), storage volumes, a hard disk, or a combination thereof. The instructions 103 may be executable by the first processing resource to perform various tasks, as described in more detail in connection with FIG. 5, herein.

Figure 2:
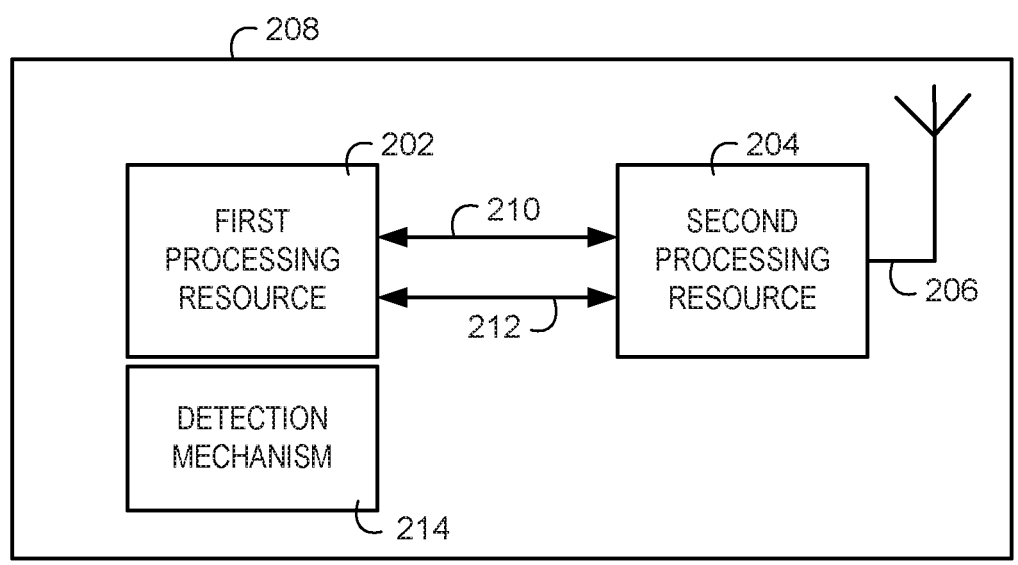
FIG. 2 illustrates a diagram of an example of a first processing resource, second processing resource, and a radio consistent with the disclosure.

FIG. 2 illustrates a diagram of an example of a first processing resource 202, second processing resource 204, and a radio 206 consistent with the disclosure. As illustrated in FIG. 2, the first processing resource 202 and the second processing resource 204 may be connected via an interface 210 and a bus 212. In some examples, the interface 210 may allow for signals to be exchanged between the first processing resource 202 and second processing resource 204, and the bus 212 may allow for activity of the second processing resource 204 to be monitored.

The radio 206 may be connected to the second processing resource 204. In some examples, the radio 206 may include an antenna, which may transmit and/or receive electromagnetic radiation (e.g., radio signals). The second processing resource 204 may control operation of the radio 206 to, for example, control transmission and/or receipt of the electromagnetic radiation.

In some examples, the first processing resource 202, second processing resource 204, and the radio 206 may be included in an AP 208. The AP 208 may facilitate connectivity with a network such as the internet to a plurality of STAs (not specifically illustrated in FIG. 2).

As shown in FIG. 2, the first processing resource 202 may be connected to the second processing resource 204 via the bus 212. In some examples, the bus 212 may be a communication bus. The first processing resource 202 may monitor the second processing resource 204 for activity. The activity may include interrupts that are received by the first processing resource 202 via the bus 212. In some examples, the interrupts may be generated by the radio 206. The interrupts may be received by the first processing resource 202 via the bus 212.

In some examples, the first processing resource 202 may be connected via the interface 210 to the second processing resource 204. The interface 210 may be a hardware interface. The first processing resource 202 may be to receive an interrupt generated by a radio 206 coupled to the second processing resource 204.

In some examples, the first processing resource 202 may be to increment a counter in response to receiving the interrupt during a configurable time interval. The first processing resource 202 may be to determine that the counter has not been incremented during a threshold number of configurable time intervals, and/or reboot the first processing resource 202 and the second processing resource 204 in response to the determination that the counter has not been incremented during the threshold number of configurable time intervals.

The AP 208 may include a detection mechanism 214. The detection mechanism 214 may include hardware and instructions to perform various tasks. For example, the detection mechanism 214 may include hardware and instructions to determine if a counter (e.g., an interrupt counter) has been incremented within a configurable time interval. In some examples, if the counter has not been incremented, the detection mechanism 214 may reboot the AP 208.

The first processing resource 202, the second processing resource 204, and the radio 206 may be included in an AP 208. In some examples, the first processing resource 202 may be a main processor of the AP 208, and the second processing resource 204 may be a co-processor of the AP 208. In some examples, the first processing resource 202 may operate according to a first operating environment, and the second processing resource 204 may operate according to a second operating environment.

Figure 3A:
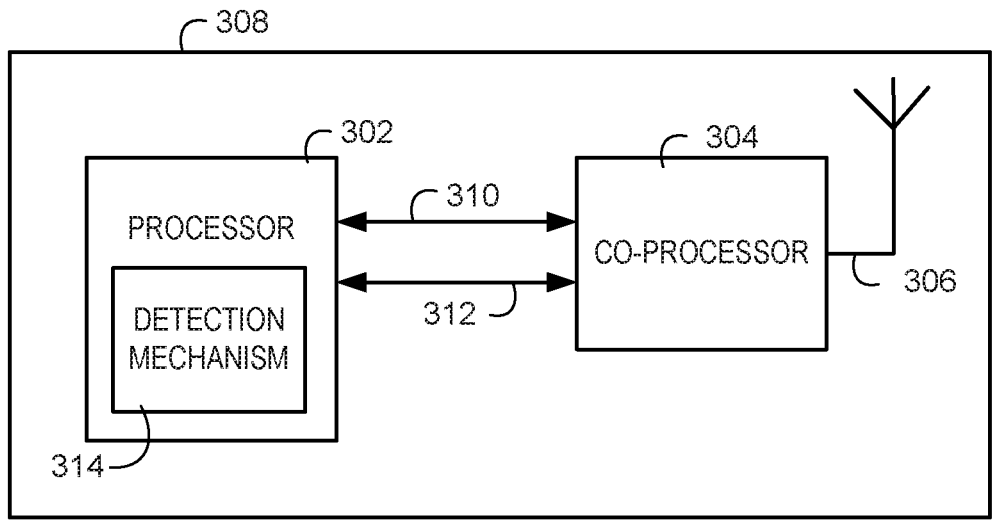
FIG. 3A illustrates a diagram of an example of an access point including a processor, a co-processor, and a radio consistent with the disclosure.

FIG. 3A illustrates a diagram of an example of an access point 308 including a processor 302, a co-processor 304, and a radio 306 consistent with the disclosure. The processor 302 may include a detection mechanism 314. As shown in FIG. 3A, the processor 302 may be connected to a co-processor 304 via interface 310 and bus 312. In some examples, the interface 310 may allow for signals to be exchanged between the processor 304 and co-processor 304, and the bus 312 may allow for activity of the co-processor 304 to be monitored. The processor 302 may be a main processor of the AP 308, and the co-processor 304 may be a radio processor of the AP 308.

In some examples, AP 308 may include a processor 302 including a detection mechanism 314 coupled to co-processor 304 via the communication bus 312. A radio 306 may be coupled to the co-processor 304. The processor 302 may receive interrupt signals from the radio 306 via the communication bus 312. In some examples, the processor 302 and/or the detection mechanism 314 may determine that an interrupt signal of the interrupt signals has not been received during a number of threshold time intervals. In some examples, the detection mechanism 314 may receive interrupt signals from the radio 306 via the communication bus 312.

The processor 302 may be to reboot the processor 302, the co-processor 304, and/or AP 308 in response to a determination that the interrupt signal has not been received during the threshold number of time intervals. For example, the processor 302 may reboot itself and/or the co-processor 304 in response to a failure of the co-processor 304.

In some examples, the interrupt signal may be generated as part of an interrupt service routine associated with the radio 306. For example, the interrupt may be generated as part of a bottom half handler routine. A number of interrupts generated may be stored in a counter. In some examples, the detection mechanism 314 may check if the counter has been incremented since a previous interval.

In some examples, the detection mechanism 314 may reboot the processor 302, co-processor 304, and/or AP 308. The detection mechanism 314 may store a specific reason for the reboot, for example, in non-volatile memory associated with the AP 308.

In some examples, a duration of each of the number of threshold time intervals may be configurable. For example, a user may select a duration for each of the number of threshold time intervals and/or may input a duration of each of the number of threshold time intervals. The duration of each of the time intervals may be greater than, less than, or equal to one second in duration.

Figure 3B:
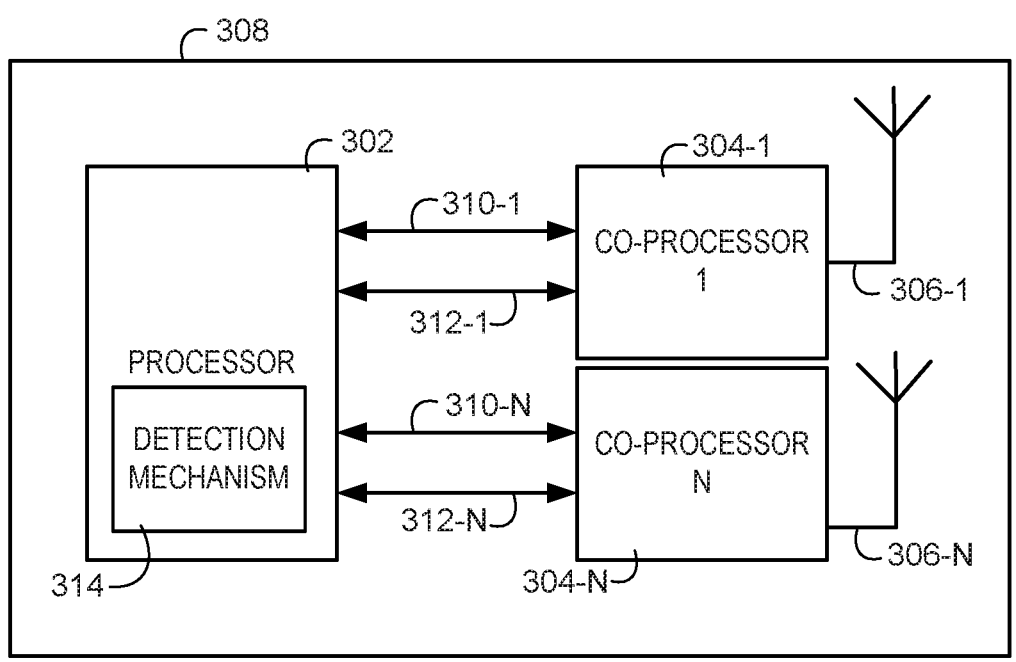
FIG. 3B illustrates a diagram of an example of an access point including a processor, a plurality of co-processors, and a plurality of radios consistent with the disclosure.

FIG. 3B illustrates a diagram of an example of an AP 308 including a processor 302, a plurality of co-processors 304-1, . . . , 304-N (referred to generally herein as co-processors 304), and a plurality of radios 306-1, . . . , 306-N (referred to generally herein as radios 306) consistent with the disclosure. The processor 302 may include a detection mechanism 314. As shown in FIG. 3B, the processor 302 may be connected to respective co-processors 304-1, . . . , 304-N among the plurality of co-processors 304 via respective interfaces 310-1, . . . , 310-N, and respective buses 312-1, . . . , 312-N. In some examples, the interfaces 310 may allow for signals to be exchanged between the processor 304 and respective co-processors 304-1, . . . , 304-N, and the buses 312 may allow for activity of the respective co-processors 304-1, . . . , 304-N to be monitored. The processor 302 may be a main processor of the AP 308, and the co-processor(s) 304 may be radio processor(s) of the AP 308.

In some examples, each respective co-processor 304-1, . . . , 304-N among the plurality of co-processors 304 may be connected to a respective radio 306-1, . . . , 306-N among the plurality of radios 306. For example, as shown in FIG. 3, coprocessor 304-1 may be connected to radio 306-1, co-processor 304-N may be connected to radio 306-N, etc.

In some examples, AP 308 may include a processor 302 including a detection mechanism 314 coupled to a co-processor (e.g., co-processor 304-1) via a communication bus (e.g., bus 312-1). A radio (e.g., radio 306-1) may be coupled to the co-processor 304-1. The processor 302 may be to receive interrupt signals from the radio 306-1 via the communication bus 312-1. In some examples, the processor 302 and/or the detection mechanism 314 may be to determine that an interrupt signal of the interrupt signals has not been received during a number of threshold time intervals. In some examples, the detection mechanism 314 may be to receive interrupt signals from the radio 306-1 via the communication bus 312-1.

The processor 302 may be to reboot the processor 302, the co-processor(s) 304, and/or AP 308 in response to a determination that the interrupt signal has not been received during the threshold number of time intervals. For example, the processor 302 may reboot itself and/or the co-processor(s) 304 in response to a failure of the co-processor(s) 304.

In some examples, the interrupt signal may be generated as part of an interrupt service routine associated with the radio (e.g., radio 306-1). For example, the interrupt may be generated as part of a bottom half handler routine. A number of interrupts generated may be stored in a counter. In some examples, the detection mechanism 314 may check if the counter has been incremented since a previous interval.

In some examples, the detection mechanism 314 may reboot the processor 302, co-processor(s) 304, and/or AP 308. The detection mechanism 314 may store a specific reason for the reboot, for example, in non-volatile memory associated with the AP 308.

In some examples, a duration of each of the number of threshold time intervals may be configurable. For example, a user may select a duration for each of the number of threshold time intervals and/or may input a duration of each of the number of threshold time intervals. The duration of each of the time intervals may be greater than, less than, or equal to one second in duration.

Figure 4:
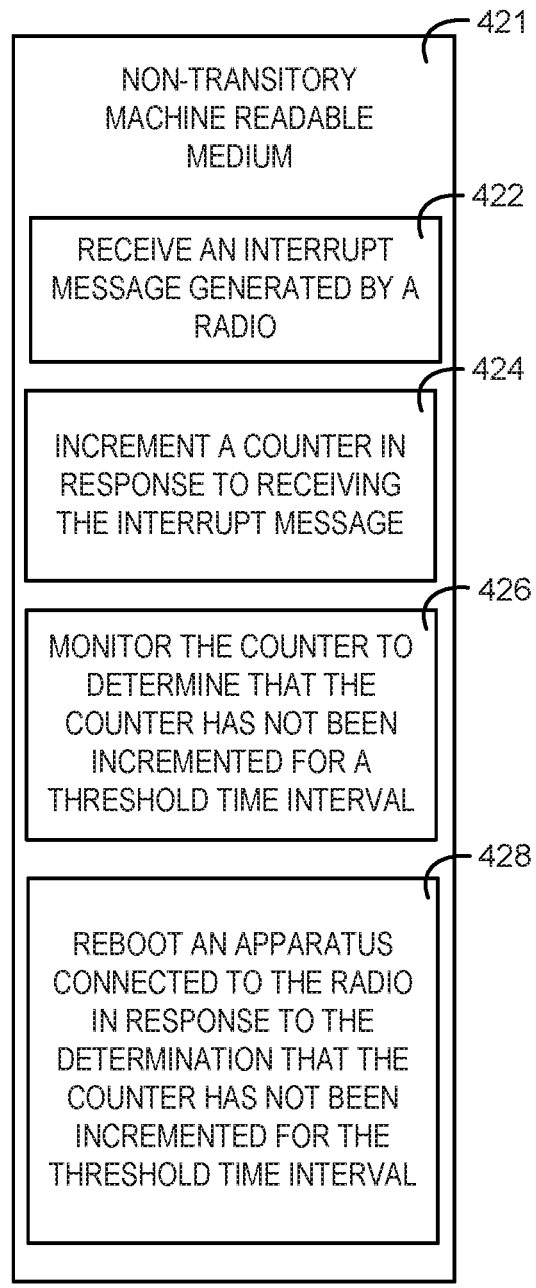
FIG. 4 illustrates a diagram of an example of a non-transitory computer readable medium and processing resource for a radio interrupt reboot consistent with the disclosure.

FIG. 4 illustrates a diagram of an example of a non-transitory machine readable medium 421. A processing resource may execute instructions stored on the non-transitory machine readable medium 421. The non-transitory machine readable medium 421 may be any type of volatile or non-volatile memory or storage, such as random access memory (RAM), read-only memory (ROM), storage volumes, a hard disk, or a combination thereof.

The example medium 421 may store instructions 422 executable by a processing resource to receive an interrupt message generated by a radio. The interrupt message may be generated as part of an interrupt service routine associated with the radio.

In some examples, the example medium 421 may store instructions 424 executable by a processing resource to increment a counter in response to receiving the interrupt message. For example, a counter associated with the radio's interrupt service routine may be incremented in response to receiving the interrupt message. In some examples, the counter may be made available to a detection mechanism associated with the AP.

In some examples, the example medium 421 may store instructions 426 executable by a processing resource to monitor the counter to determine that the counter has not been incremented for a threshold time interval. In some examples, the processing resource may include a detection mechanism to monitor the counter.

In some examples, the example medium 421 may store instructions 428 executable by a processing resource to reboot an apparatus connected to the radio in response to the determination that the counter has not been incremented for the threshold time interval. In some examples, the processing resource may include a detection mechanism to reboot the apparatus in response to the determination that the counter has not been incremented for the threshold time interval.

In some examples, the instructions to reboot the apparatus may include instructions that are executable to reboot an AP connected to the radio. The example medium 421 may store instructions executable by a processing resource to store a state of the apparatus prior to rebooting the apparatus. For example, the processing resource may include a detection mechanism to store the state of the apparatus prior to rebooting the apparatus.

Figure 5:
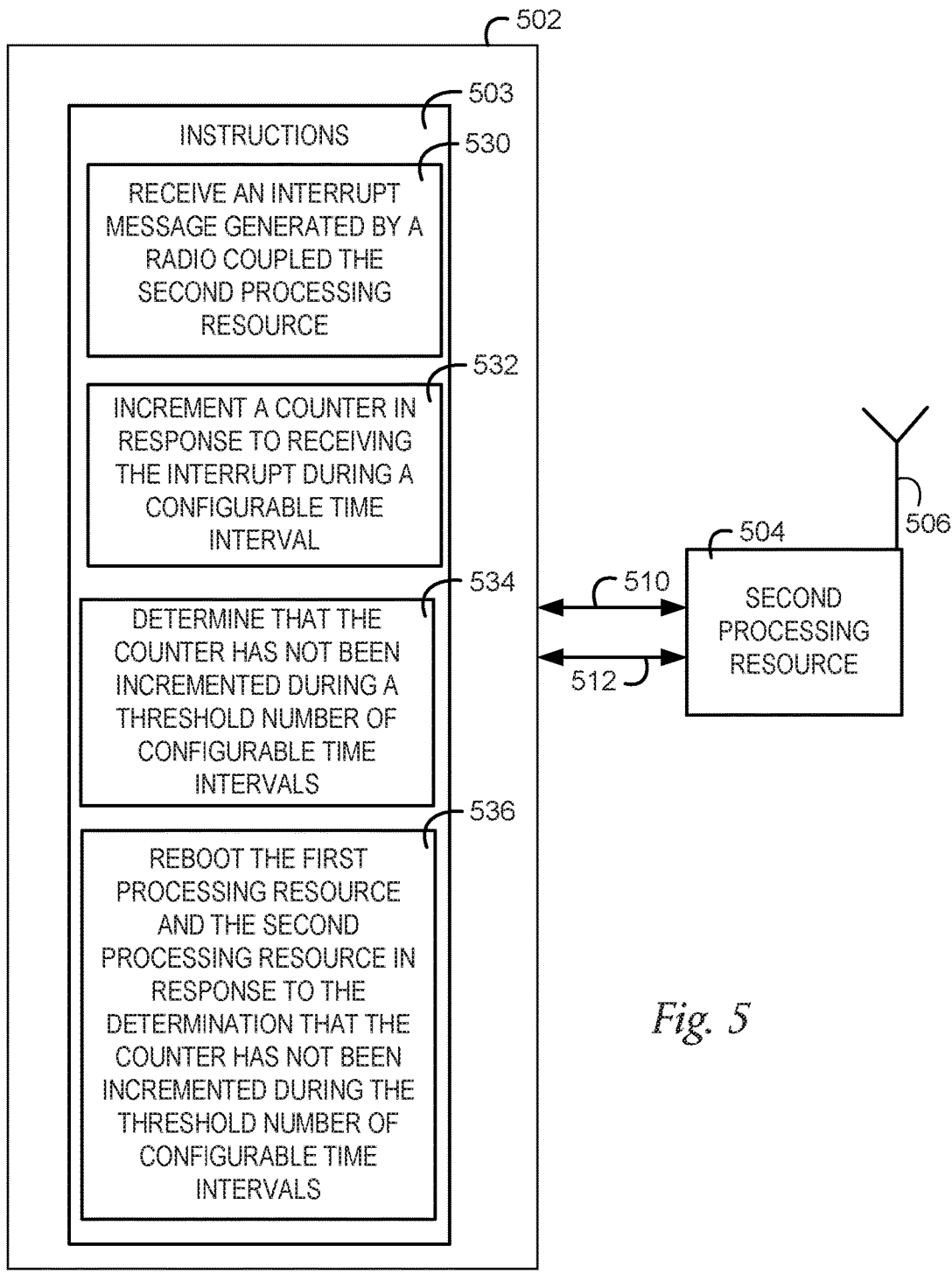
FIG. 5 illustrates an example of a first processing resource including instructions and a second processing resource consistent with the disclosure.

FIG. 5 illustrates an example of a first processing resource 502 including instructions 503 and a second processing resource 504 consistent with the disclosure. As shown in FIG. 5, a radio 506 may be connected to the second processing resource 504. The instructions 503 may be stored on a non-transitory machine readable medium. The non-transitory machine readable medium may be any type of volatile or non-volatile memory or storage, such as random access memory (RAM), flash memory, read-only memory (ROM), storage volumes, a hard disk, or a combination thereof.

As illustrated in FIG. 5, the processing resource 502 may be connected to a second processing resource 504 via interface 510 and communication bus 512. The first processing resource 502 may monitor the second processing resource 504 for activity. The activity may include interrupts that are received by the first processing resource 502 via the bus 512. In some examples, the interrupts may be generated by a radio 506. The interrupts may be received by the first processing resource 502 via the bus 512.

At 530 the instructions 503 may be executable by the first processing resource 502 to receive an interrupt generated by a radio 506 coupled to the second processing resource 504. At 532, the instructions 503 may be executable by the first processing resource 502 to increment a counter in response to receiving the interrupt during a configurable time interval. At 534, the instructions 503 may be executable by the first processing resource 502 to determine that the counter has not been incremented during a threshold number of configurable time intervals. At 536, the instructions 503 may be executable by the first processing resource 502 to reboot the first processing resource 502 and the second processing 504 resource in response to the determination that the counter has not been incremented during the threshold number of configurable time intervals.

As illustrated in FIGS. 2, 3A, and 3B, herein, the first processing resource 502, the second processing resource 504, and the radio 506 may be included in an AP. In some examples, the first processing resource 502 may be a main processor of the AP, and the second processing resource 504 may be a co-processor of the AR. The interface 510 may be a hardware interface.

In some examples, the first processing resource 502 may operate according to a first operating environment and the second processing resource 504 may operate according to a second operating environment. In some examples, the first processing resource 502 may be further connected to the second processing resource 504 via a communication bus 510. In some examples, the interrupt may be received via the communication bus 510.

In the foregoing detailed description of the present disclosure, reference is made to the accompanying drawings that form a part hereof, and in which is shown by way of illustration how one or more examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, designators such as "N", etc., particularly with respect to reference numerals in the drawings, indicate that a number of the particular feature so designated can be included. As used herein, "a number of" a particular thing can refer to one or more of such things (e.g., a number of computing devices can refer to one or more computing devices). A "plurality of" is intended to refer to more than one of such things. Multiple like elements may be referenced herein generally by their reference numeral without a specific identifier at the end. For example, a plurality of co-processors 304-1, . . . , 304-N may be referred to herein generally as co-processors 304.

The figures herein follow a numbering convention in which the first digit corresponds to the drawing figure number and the remaining digits identify an element or component in the drawing. For example, reference numeral 204 may refer to element "04" in FIG. 2 and an analogous element may be identified by reference numeral 304 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

As used herein, "logic" is an alternative or additional processing resource to perform a particular action and/or function, etc., described herein, which includes hardware, for example, various forms of transistor logic, application specific integrated circuits (ASICs), etc., as opposed to computer executable instructions, for example, instructions, etc., stored in memory and executable by a processor.

What is claimed:

1. An apparatus, comprising:
   a first processing resource connected via an interface to a second processing resource, the first processing resource to execute instructions to:
     receive an interrupt generated by a radio coupled to the second processing resource;
     increment a counter in response to receiving the interrupt during a configurable time interval;
     determine that the counter has not been incremented during a threshold number of configurable time intervals, wherein a duration of a threshold time interval included in the threshold number of configurable time intervals is configurable; and
     reboot the first processing resource and the second processing resource in response to the determination that the counter has not been incremented during the threshold number of configurable time intervals.

2. The apparatus of claim 1, wherein the first processing resource, the second processing resource, and the radio are included in an access point (AP).

3. The apparatus of claim 2, wherein the first processing resource is a main processor of the AP, and the second processing resource is a co-processor of the AP.

4. The apparatus of claim 1, wherein the interface is a hardware interface.

5. The apparatus of claim 1, wherein the first processing resource operates according to a first operating environment and the second processing resource operates according to a second operating environment.

6. The apparatus of claim 1, wherein the first processing resource is further connected to the second processing resource via a communication bus, and wherein the interrupt is received via the communication bus.

7. An access point, comprising:
   a processor including a detection mechanism coupled to a co-processor via a communication bus; and
   a radio coupled to the co-processor;
   wherein the processor is to:
     receive interrupt signals from the radio via the communication bus; and wherein the detection mechanism is to:
     determine that an interrupt signal of the interrupt signals has not been received during a number of threshold time intervals, wherein a duration of a threshold time interval included in the threshold number of time intervals is configurable; and
     reboot the processor and co-processor in response to the determination that the interrupt signal has not been received during the number of threshold time intervals.

8. The access point of claim 7, wherein a duration of each of the number of threshold time intervals is configurable.

9. The access point of claim 8, wherein the duration of each of the number of threshold time intervals is greater than one second in duration.

10. The access point of claim 7, wherein the interrupt is generated as part of an interrupt service routine associated with the radio.

11. The access point of claim 7, wherein the processor is a main processor of the access point, and the co-processor is a radio processor of the access point.

12. A non-transitory machine-readable medium storing instructions
    executable by a processing resource to:
      receive an interrupt message generated by a radio coupled to a second processing resource;
      increment a counter in response to receiving the interrupt message;
      monitor the counter to determine that the counter has not been incremented for a threshold number of configurable time intervals, wherein a duration of a threshold time interval included in the threshold number of configurable time intervals is configurable; and
      reboot an apparatus connected to the radio in response to the determination that the counter has not been incremented for the threshold number of configurable time intervals.

13. The non-transitory machine-readable medium of claim 12, wherein the instructions to reboot the apparatus include instructions that are executable to reboot an access point connected to the radio.

14. The non-transitory machine-readable medium of claim 12, wherein the instructions are executable to store a state of the apparatus prior to rebooting the apparatus.

* * * * *